(12) United States Patent
Harding

(10) Patent No.: US 9,163,728 B2
(45) Date of Patent: Oct. 20, 2015

(54) STRIP SEALS

(75) Inventor: Adrian L Harding, Derby (GB)

(73) Assignee: ROLLS-ROYCE plc, London (GB)

( * ) Notice: Subject to any disclaimer, the term of this patent is extended or adjusted under 35 U.S.C. 154(b) by 536 days.

(21) Appl. No.: 13/604,034

(22) Filed: Sep. 5, 2012

(65) Prior Publication Data

US 2013/0089414 A1    Apr. 11, 2013

(30) Foreign Application Priority Data

Oct. 5, 2011    (GB) .................................. 1117084.2

(51) Int. Cl.
  F16J 15/06   (2006.01)
  F02C 7/28    (2006.01)
  F01D 11/00   (2006.01)
  F16J 15/08   (2006.01)

(52) U.S. Cl.
  CPC ............ *F16J 15/0887* (2013.01); *F01D 11/005* (2013.01); *F01D 11/008* (2013.01); *F02C 7/28* (2013.01); *F05D 2240/12* (2013.01); *F05D 2260/30* (2013.01)

(58) Field of Classification Search
  CPC ......... F16J 15/021; F16J 15/025; F16J 15/06; F16J 15/0887; F02C 7/28; F01D 11/005; F01D 11/008; F05D 2240/57
  USPC ................................................. 415/134, 139
  See application file for complete search history.

(56) References Cited

U.S. PATENT DOCUMENTS

| | | | |
|---|---|---|---|
| 4,524,980 A | 6/1985 | Lillibridge et al. | |
| 5,154,577 A | 10/1992 | Kellock et al. | |
| 5,221,096 A * | 6/1993 | Heldreth et al. | 277/630 |
| 5,655,876 A * | 8/1997 | Rock et al. | 415/139 |
| 5,709,530 A | 1/1998 | Cahill et al. | |
| 5,975,844 A * | 11/1999 | Milazar et al. | 415/138 |
| 5,988,975 A | 11/1999 | Pizzi | |
| 7,201,559 B2 * | 4/2007 | Gendraud et al. | 415/173.1 |
| 7,530,233 B2 * | 5/2009 | Milazar | 60/805 |

FOREIGN PATENT DOCUMENTS

| | | |
|---|---|---|
| EP | 0 147 354 A1 | 7/1985 |
| EP | 1 074 695 A2 | 2/2001 |
| EP | 1 785 592 A2 | 5/2007 |
| EP | 2 213 841 A1 | 8/2010 |
| WO | WO 2007/101757 A1 | 9/2007 |

OTHER PUBLICATIONS

Search Report issued in European Patent Application No. 12 18 3121 dated Jan. 21, 2013.
Search Report issued in British Patent Application No. 1117084.2 dated Jan. 31, 2012.

* cited by examiner

*Primary Examiner* — Edward Look
*Assistant Examiner* — Jason Davis
(74) *Attorney, Agent, or Firm* — Oliff PLC

(57) ABSTRACT

A strip seal for providing a seal between adjacent components, which include a first groove and a second groove angled with respect to and intersecting the first groove. The grooves of respective components are opposed to one another when the components are assembled. The strip seal includes a first strip section to span between and be received in the opposed first grooves, and a second strip section to span between and be received in the opposed second grooves. One end of the first strip section is arranged to butt against the second strip section at the intersection of the grooves. The other end of the first strip section has at least one deformable projection that can engage the end of the first groove. The projection deforms as it engages the end of the groove and urges the end of the first strip section against the second strip section.

14 Claims, 3 Drawing Sheets

Section X-X

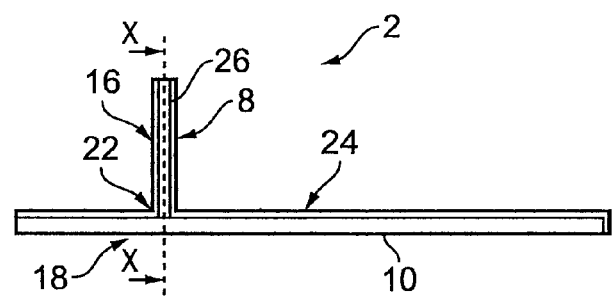
FIG. 1
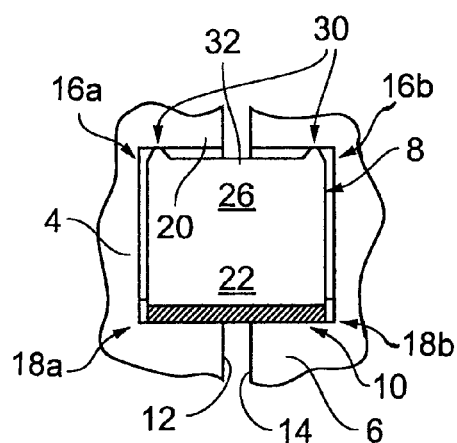
Section X-X
FIG. 2
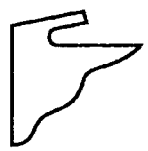 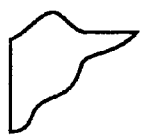 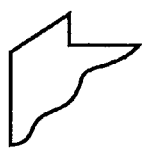 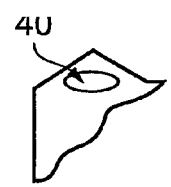
FIG. 3(a)   FIG. 3(b)   FIG. 3(c)   FIG. 3(d)

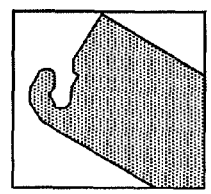
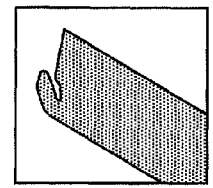
FIG. 3(e)    FIG. 3(f)
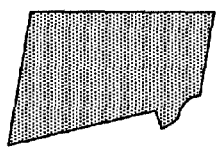
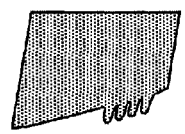
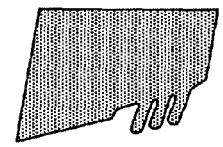
FIG. 3(g)    FIG. 3(h)    FIG. 3(i)
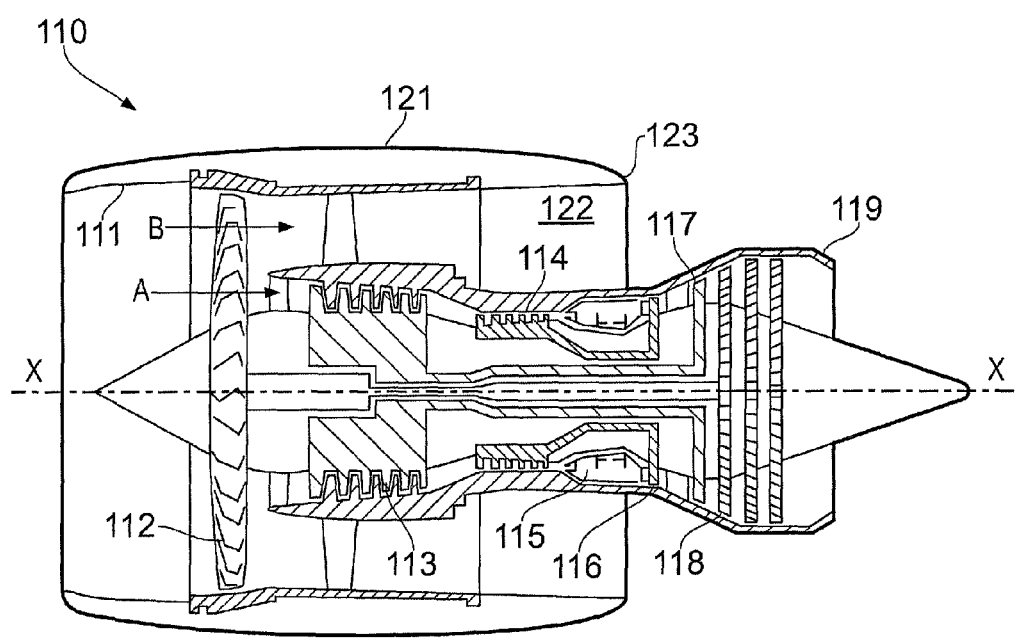
FIG. 4

STRIP SEALS

FIELD OF THE INVENTION

The present invention relates to strip seals and more particularly, although not necessarily exclusively, strip seals for providing a seal between two adjacent components in a gas turbine engine.

BACKGROUND

Gas turbine engines include a number of annular assemblies, such as shrouds, casings and nozzles, centred about the engine's axis, and defining annular passages for flow paths within the engine. These annular assemblies are typically formed by a series of circumferential segments. Seals are required between adjacent segments to avoid gas leakage between the segments across the annular assemblies. A poor seal will result in gas leakage from a high pressure side of the annular assembly to a low pressure side and lead to a reduction in engine efficiency.

It is known to use strip seals to form a seal between adjacent segments in these annular assemblies. Grooves are formed in each of the abutting faces of the segments so that the grooves are opposed to one another when the segments are assembled. A thin, typically metallic, strip is inserted into the grooves, opposite edges of the strip being received in respective grooves in the opposed faces of the segments, so the strip spans between the two segments to inhibit the flow of gas between the segments.

Often it is desirable to have strip seal portions that inhibit gas flow in an axial direction as well as a radial direction. To enable this, the opposed faces of adjacent segments will typically have an axially extending groove and a radially extending groove that intersect one another, into which the strip seal portions are received.

U.S. Pat. No. 4,524,980 describes a strip seal arrangement that can be accommodated in grooves that are angled to one another. In this arrangement, two straight strip seal sections are assembled to intersect with one another (to correspond to the intersection of the grooves they are to be mounted in) but this requires the strip sections to be formed with interlocking cut-outs, which adds to the complexity of the manufacture and assembly of the seal. U.S. Pat. No. 5,709,530 describes another example of interlocking strip seal sections.

U.S. Pat. No. 5,154,577 describes another strip seal arrangement that employs straight strip sections. In this arrangement, straight strip sections are received in respective ones of the radial and axial grooves but these strip sections terminate short of the intersection of the grooves. A third, bent corner strip section is used to provide the seal at the intersection of the grooves, extending around the corner at the intersection, with opposite ends of this short third strip overlapping ends of the other strips. Although this approach avoids the complexities of manufacturing interlocking strip segments, the need for a third strip section adds to the component count and the complexity of assembly of the strip seal arrangement.

In other known sealing arrangements, the junction of the axial and radial grooves is curved and a similarly curved, one-piece strip seal is received in the opposed grooves of adjacent segments to form the seal. However, such curved strip seals are difficult and expensive to manufacture to the desired tolerances and can be awkward to assemble.

U.S. Pat. No. 5,988,975 describes another form of one-piece strip seal in which the strip is bent and doubled back on itself to form upstanding portions that extend from a horizontal base portion of the strip. The upstanding portions are configured to lie in radial grooves in the adjacent components they span between, whilst the horizontal base of the strip is received in axial grooves in the components. This strip is complex to form and will be difficult to assemble into the grooves.

SUMMARY OF INVENTION

A general aim of the present invention is to provide an improved strip seal arrangement that is simple to manufacture and easy to assemble, whilst providing an effective seal.

A first aspect of the present invention provides a strip seal for providing a seal between opposed faces of adjacent components, the opposed faces of the components each having formed therein a first groove and a second groove angled with respect to and intersecting the first groove, the grooves of respective components being opposed to one another when the components are assembled, the strip seal comprising:

a first strip section to span between and be received in the opposed first grooves; and a second strip section to span between and be received in the opposed second grooves;

one end of the first strip section arranged to butt against the second strip section at the intersection of the grooves, the other end of the first strip section having at least one deformable projection that can engage the end of the first groove, whereby the projection can deform as it engages the end of the groove to urge said one end of the first strip section against the second strip section.

This simple construction can ensure a tight joint between the mating strip seal sections through the deformation of the projection at the end of the first strip seal section during the assembly of the joint. Strip seals in accordance with this aspect of the invention can be simple and relatively cheap to produce, can be made using current production processes, and the resulting joint is simple to assemble and effectively sealed.

In a second aspect the invention provides an assembly comprising:

at least two components arranged adjacent to one another, opposed faces of the components each having formed therein a first groove and a second groove angled with respect to and intersecting the first groove, the grooves of respective components being opposed to one another; and a strip seal comprising:

a first strip section that spans between and is received in the opposed first grooves; and a second strip section that spans between and is received in the opposed second grooves;

wherein one end of the first strip section butts against the second strip section at the intersection of the grooves, the other end of the first strip section having at least one deformable projection that is compressed against the end of the first groove to urge said one end of the first strip section against the second strip section.

The assembly may be an assembly for a gas turbine engine, for example an annular assembly such as a shroud, casing or nozzle, in which the components are circumferential segments that when joined form the annular assembly. The assembly may comprise any number of components with strip seals arranged between each pair of adjacent components. In currently envisaged applications there will typically be between 20 and 40 components. In some applications there may be more components. Exemplary applications include turbine components such as high pressure ('HP') and intermediate pressure (IP) nozzle guide vanes ('NGV's), seal segments, segment carriers and annulus fillers.

The applicant's studies of the performance of strip seals have shown that using straight strips with a tight joint is more effective than using a bent strip. Preferably therefore at least one of the first and second strip sections is straight. More preferably both the first and second strip sections are straight.

The deformable projection at the end of the first strip section will generally not extend across the full width of the strip. The projection may be at one side of the end of the strip. The projection projects in the longitudinal direction of the strip.

The projection is preferably housed entirely within the groove. This can help to ensure the best leakage control at the end of the seal with the projection.

In some embodiments there are two deformable projections at the end of the strip. There may, for example, be one deformable projection at each side of the end of the strip. Both projections extend in the longitudinal direction of the strip. Some embodiments may have more than two deformable projections.

Preferably the or each projection is formed integrally with the strip, for example by appropriate shaping of the end of the strip to provide the projection(s).

The projections may be any of a number of suitable shapes, so long as they are able to deform resiliently when forced against the end of the groove in order to provide a force to urge the other end of the first strip section into its butting engagement against the second strip section when the seal is assembled. The size and shape of the deformable projections may be varied between different embodiments of the strip seal to account for the differing levels of fit between strips and grooves that may be required dependent, for example, on the intended application.

Preferably the projection or projections are housed entirely within the groove. This helps to ensure the best leakage control at that end of the seal.

In preferred embodiments, the projections taper in the longitudinal direction of the strip so that at their tips they are inward of the edge of the strip. In this way, they can provide a lead-in for ease of assembly of the strip into the groove.

The deformation of the projections can also accommodate differences in length between the groove and the strip section due to tolerances in their manufacture. So long as the strip section is sufficiently longer than the groove, the projections will be compressed and provide the desired force to urge the other end of the first strip section against the second strip section to form a tight butt joint between the two.

Strip seals of embodiments of the present invention may be formed from materials that are used for conventional strip seals that are known already. Typically they will be metallic. Other suitable materials may be used.

BRIEF DESCRIPTION OF DRAWINGS

An embodiment of the invention will now be described by way of example with reference to the accompanying drawings in which:

FIG. 1 schematically shows a side view of a multi-piece strip seal in accordance with an embodiment of the invention;

FIG. 2 shows a section along X-X in FIG. 1;

FIGS. 3(a) to 3(i) show alternative configurations for a deformable feature of the strip seal of FIG. 1;

FIG. 4 shows schematically a longitudinal cross-section through a ducted fan gas turbine engine.

DESCRIPTION OF EMBODIMENT

Figure 5:
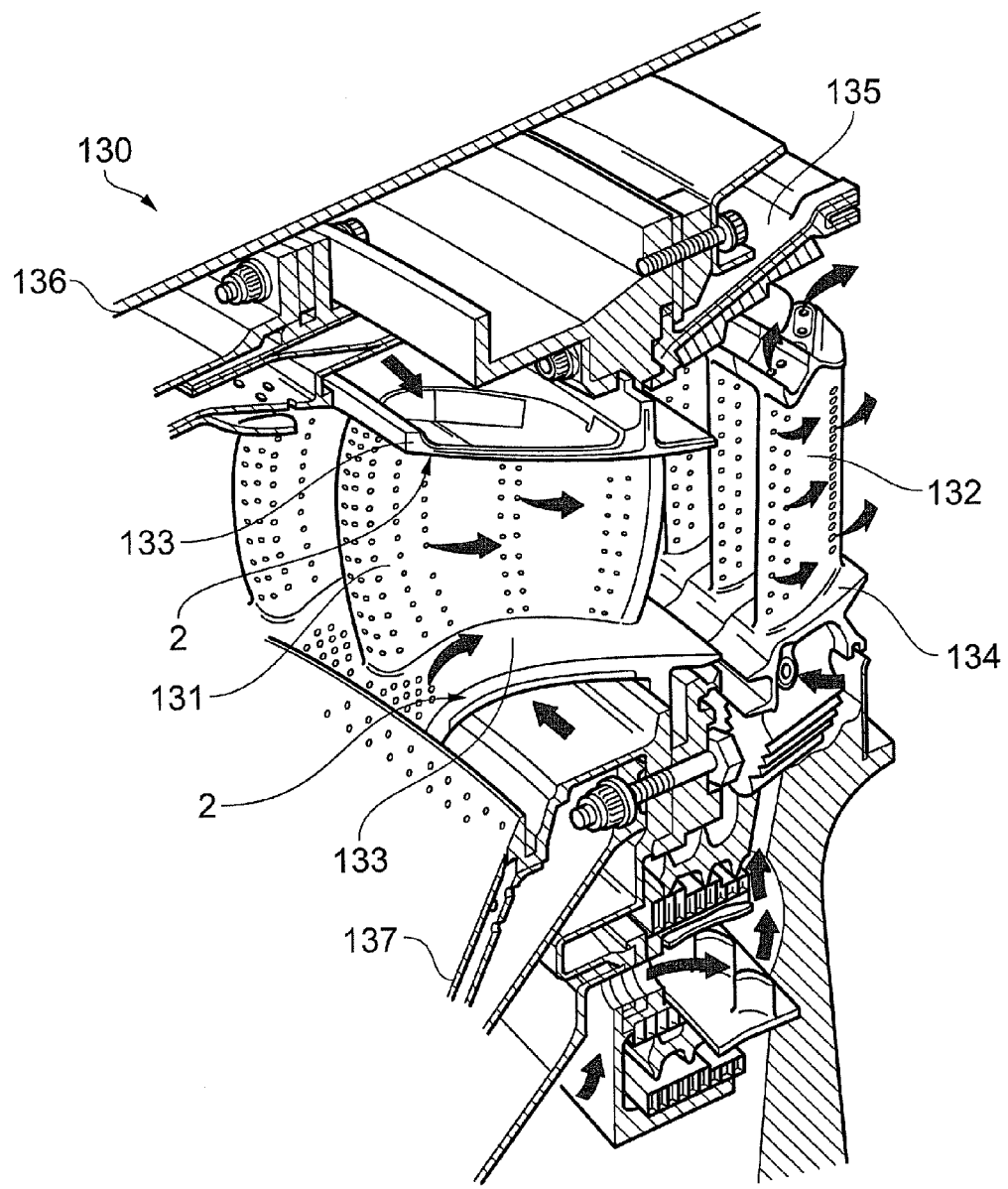
FIG. 5 shows an isometric view of a typical single stage cooled turbine.

FIGS. 1 and 2 show a strip seal arrangement 2, in accordance with an embodiment of the invention, for providing a seal between two adjacent components 4, 6 to inhibit flow of a fluid (e.g. gas) from a high pressure side of the seal to a low pressure side of the seal. Strip seal sections 8, 10 span between the two components 4, 6 to form the seal.

Opposed faces 12, 14 of the components each have grooves 16, 18 formed therein to receive respective edges of the seal sections 8, 10. These grooves lie opposed to one another when the components 4, 6 are in their assembled state. In this example, a first, shorter pair of opposed grooves 16a, 16b, extend vertically as seen in FIG. 1 (which may correspond, for example, to a radial direction of the components). The second, longer pair of opposed grooves 18a, 18b extend at an angle to the first grooves 16. In this example the second pair of grooves extend vertically as seen in FIG. 1 (which may correspond to a radial direction of the components), so are perpendicular to the first grooves. One end of each of the first grooves 16 intersects a respective one of the second grooves 18 part way along the length of the second groove. The other ends of the first grooves 16 have end walls 20 that engage with the first strip seal sections in the manner described further below.

The strip seal sections 8, 10 are sized so that when they are located in the grooves 16, 18, one end 22 (the lower end as seen in the figures) of the first strip seal section 8 butts against the surface 24 of the second strip section 10 that faces the first grooves 16 (the top surface as seen in the figures). There are no interlocking elements at this joint between the two strip sections 8, 10. The end 22 of the first strip section 8 simply presses against the surface 24 of the second strip section 24.

In accordance with the invention, in order to urge the end 22 of the first strip section 8 against the surface 24 of the second strip section 10, to ensure a tight joint and an effective seal, the other end 26 (the top end as seen in the figures) of the first strip seal section 8 is formed with a pair of deformable projections 30, one to either side of the strip, which project beyond the main end edge 32 of the strip 8 in the longitudinal direction of the strip 8. Although a pair of projections 30 is used in this example, other embodiments can use only a single projection, e.g. a single projection at one side only of the end of the strip 8.

The length of the first strip section 8 is selected relative to the length of the first grooves 16 to be slightly longer than the grooves 16, so that when the strip section 8 is received in the grooves 16, with the end opposite the projections 30 butted against the second strip section 10, the deformable projections 30 are compressed against the respective end walls 20 of the first grooves 16. The projections 30 are resiliently deformable so that this compression results in a restoring force that acts to urge the other end 22 of the first strip section 8 firmly against the surface 24 of the second strip section 10.

The deformable projections 30 are not visible when fully fitted into the groove. That is, the projections are housed entirely within the groove. This helps to ensure the best leakage control at that end of the seal.

In this example, the deformable projections 30 are formed integrally with the first strip section 8 by appropriate shaping of the end 26 of the strip section during production.

The shape and construction of the projections 30 can be designed to match the desired application requirements, including for example the desired force pressing the strip sections 8, 10 together to obtain a tight seal.

In some cases it may also be desirable to shape the projections so that can serve as a feed-in to aid assembly of the first strip section 8 into the first grooves 16. For instance, in the example seen in FIGS. 1 and 2, the projections taper away from the main end edge 32 of the first strip section 8, so that at the spacing between the tips of the projections is less that the width of the main part of the strip section 8.

FIGS. 3(*a*) to 3(*d*) show four or a large number of possible alternative shapes for the deformable projections 30. The deformable projections may be formed on one or both sides of the end of the strip seal.

The projection in FIG. 3(*a*) is in the form of a cantilevered finger that extends inwardly from the edge of the strip.

The projection of FIG. 3(*b*) is similar in shape to the projections seen in FIG. 2 but has a more rounded tip and smoother transitions into the main end edge of the strip.

The projection of FIG. 3(*c*) is also similar in shape to the projections seen in FIG. 2 but rather than having a sloping inner edge, the inner edge extends step-like in the longitudinal direction of the strip.

The outer shape of the projection seen in FIG. 3(*d*) is the same as that of the projections seen in FIG. 2 but in this example there is a through hole 40 extending through the depth of the strip to allow for greater deformation of the strip.

The projection of FIG. 3(*e*) is similar to the cantilevered finger of FIG. 3(*a*), as is the projection seen in FIG. 3(*f*). These two figures illustrate complete strip sections, having different strip widths. The overall dimensions of the strip can be selected based on their intended application.

FIG. 3(*g*) shows a projection similar to that of FIG. 3(*c*) but in this example the end of the strip seal section is angled.

FIGS. 3(*h*) and 3(*i*) show two further examples of strip seal sections with angled ends. In these examples, the deformable projections take the form of a plurality (4 in the specific example of FIGS. 3(*h*) and 3 in the specific example of FIG. 3(*i*)) of finger-like projections that extend outwardly from the end of the strip section, parallel with one another.

This invention applies principally to strip-seal joints, but may be applied to any similar application.

Strip seals in accordance with embodiments of the invention are particularly suited for use in turbine components, such as HP an IP NGVs, seal segments, segment carriers and annulus fillers.

With reference to FIG. 4, a ducted fan gas turbine engine generally indicated at 110 has a principal and rotational axis X-X. The engine comprises, in axial flow series, an air intake 111, a propulsive fan 112, an intermediate pressure compressor 113, a high-pressure compressor 114, combustion equipment 115, a high-pressure turbine 116, and intermediate pressure turbine 117, a low-pressure turbine 118 and a core engine exhaust nozzle 119. A nacelle 121 generally surrounds the engine 110 and defines the intake 111, a bypass duct 122 and a bypass exhaust nozzle 123.

The gas turbine engine 110 works in a conventional manner so that air entering the intake 111 is accelerated by the fan 112 to produce two air flows: a first air flow A into the intermediate pressure compressor 113 and a second air flow B which passes through the bypass duct 122 to provide propulsive thrust. The intermediate pressure compressor 113 compresses the air flow A directed into it before delivering that air to the high pressure compressor 114 where further compression takes place.

The compressed air exhausted from the high-pressure compressor 114 is directed into the combustion equipment 115 where it is mixed with fuel and the mixture combusted. The resultant hot combustion products then expand through, and thereby drive the high, intermediate and low-pressure turbines 116, 117, 118 before being exhausted through the nozzle 119 to provide additional propulsive thrust. The high, intermediate and low-pressure turbines respectively drive the high and intermediate pressure compressors 114, 113 and the fan 112 by suitable interconnecting shafts.

FIG. 5 shows an isometric view of a typical single stage cooled turbine 130 of the gas turbine engine. Cooling air flows are indicated by arrows. The performance of the turbine, whether measured in terms of efficiency or specific output, is improved by increasing sealing between components. Sealing between components prevents working gases and cooling flows entering regions of the engine not intended.

The turbine stage 130 includes a number of annular assemblies, such as the circumferentially segment shroud 135, rotor blade array 132, stator vane array 131 as well as the casing 136 and nozzle 137. All these components and others in a gas turbine engine may embody the above described strip seal arrangement 2. For example, the strip seal arrangement 2 can be used to seal between abutting platforms 133 of circumferentially adjacent vanes 132. While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A strip seal for providing a seal between opposed faces of adjacent components, the opposed faces of the components each having formed therein a first groove and a second groove angled with respect to and intersecting the first groove, the grooves of respective components being opposed to one another when the components are assembled, the strip seal comprising:
   a first strip section to span between and be received in the opposed first grooves; and
   a second strip section to span between and be received in the opposed second grooves;
   wherein one end of the first strip section is arranged to butt against the second strip section at the intersection of the grooves, the other end of the first strip section having at least one deformable projection that can engage the end of the first groove, whereby the projection can deform as it engages the end of the groove to urge said one end of the first strip section against the second strip section.

2. A strip seal according to claim 1, wherein at least one of the first and second strip sections is straight.

3. A strip seal according to claim 2, wherein both the first and second strip sections are straight.

4. A strip seal according to claim 1, wherein the deformable projection at the end of the first strip section does not extend across the full width of the strip.

5. A strip seal according to claim 4, wherein the projection is at one side of the end of the strip.

6. A strip seal according to claim 1, comprising at least two deformable projections at said one end of the first strip section.

7. A strip seal according to claim 6, comprising one deformable projection at each side of said one end of the strip.

8. A strip seal according to claim 1, wherein the or each deformable projection is formed integrally with the end of the first strip section.

9. A strip seal according to claim 1, wherein the or each deformable projection tapers in the longitudinal direction of the first strip segment so as to provide a lead-in for ease of assembly of the strip into the groove.

10. An assembly comprising:
    at least two components arranged adjacent to one another, opposed faces of the components each having formed therein a first groove and a second groove angled with respect to and intersecting the first groove, the grooves of respective components being opposed to one another; and
    a strip seal comprising:
    a first strip section that spans between and is received in the opposed first grooves; and
    a second strip section that spans between and is received in the opposed second grooves;
    wherein one end of the first strip section butts against the second strip section at the intersection of the grooves, the other end of the first strip section having at least one deformable projection that is compressed against the end of the first groove to urge said one end of the first strip section against the second strip section.

11. An assembly according to claim 10, comprising three or more components with strip seals arranged between each pair of adjacent components.

12. An assembly according to claim 10, wherein the assembly is an annular assembly in which the components are circumferential segments that when joined form the annular assembly.

13. An assembly according to claim 10, wherein the assembly forms part of a gas turbine engine.

14. An assembly according to claim 13, wherein the assembly is a shroud, a casing or a nozzle.

\* \* \* \* \*